United States Patent
Campbell

(10) Patent No.: US 7,400,748 B2
(45) Date of Patent: Jul. 15, 2008

(54) METHOD FOR ASSISTING VISUALLY IMPAIRED USERS OF A SCANNING DEVICE

(75) Inventor: Sarah E. Campbell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 723 days.

(21) Appl. No.: 10/737,516

(22) Filed: Dec. 16, 2003

(65) Prior Publication Data

US 2005/0129284 A1 Jun. 16, 2005

(51) Int. Cl.
G06K 9/00 (2006.01)
G06K 9/20 (2006.01)
G10L 11/00 (2006.01)

(52) U.S. Cl. .................. 382/114; 382/317; 704/271

(58) Field of Classification Search ............... 382/114; 704/270.01, 270; 434/112; 348/825.19, 348/62; 340/825.19
See application file for complete search history.

(56) References Cited

U.S. PATENT DOCUMENTS

| | | | |
|---|---|---|---|
| 4,563,771 A * | 1/1986 | Gorgone et al. ............. 382/135 |
| 4,972,501 A * | 11/1990 | Horyu ......................... 382/114 |
| 5,287,204 A | 2/1994 | Koizumi et al. |
| 5,410,611 A | 4/1995 | Huttenlocher et al. |
| 5,621,818 A | 4/1997 | Tashiro |
| 5,686,960 A * | 11/1997 | Sussman et al. .......... 348/218.1 |
| 5,757,958 A | 5/1998 | Shimizu et al. |
| 5,828,932 A | 10/1998 | Ohata et al. |
| 5,917,175 A * | 6/1999 | Miller et al. ............ 235/472.01 |
| 5,971,279 A * | 10/1999 | Raistrick et al. ........ 235/472.01 |
| 6,079,624 A * | 6/2000 | Apperson et al. ............ 235/494 |
| 6,140,913 A * | 10/2000 | Okada et al. ............. 340/407.2 |
| 6,170,750 B1 * | 1/2001 | Ueno ...................... 235/462.1 |
| 6,243,682 B1 * | 6/2001 | Eghtesadi et al. ............ 704/270 |
| 6,289,304 B1 * | 9/2001 | Grefenstette .................... 704/9 |
| 7,106,916 B1 * | 9/2006 | Owen et al. .................. 382/317 |
| 2002/0158133 A1 * | 10/2002 | Conzola et al. ......... 235/462.45 |
| 2003/0036909 A1 * | 2/2003 | Kato ........................... 704/275 |
| 2003/0069977 A1 * | 4/2003 | Heiden ....................... 709/227 |

* cited by examiner

Primary Examiner—Andrew W. Johns
Assistant Examiner—Andrae Allison
(74) Attorney, Agent, or Firm—Joseph M. Young

(57) ABSTRACT

A method for assisting a visually impaired person with a document job. The method includes scanning a document that includes at least one sheet, detecting at least one characteristic of the scanned document, and providing a signal identifying the at least one characteristic.

20 Claims, 3 Drawing Sheets

METHOD FOR ASSISTING VISUALLY IMPAIRED USERS OF A SCANNING DEVICE

The embodiments described herein relate generally to a method for assisting the visually impaired use printing devices.

Printing devices, scanning devices, and fax machines are fixtures of the office place. Currently, when loading documents into such a device, blind or visually impaired operators would have difficulty determining the correct orientation and positioning of documents into one of these devices. Further, they may not know which features to select to achieve a desired output.

In considering the applications of Section 508 of the Americans with Disabilities Act (29 U.S.C. § 794d), business equipment will have to be designed to allow for easier access by a wider body of users, with a variety of physical limitations.

As 508 compliance becomes a design goal, assistive user interfaces are being developed to allow blind or low vision users to independently use a walkup copier or multifunction device. A logical extension of these designs is a method for allowing those same users to independently determine the characteristics of their original in order to increase their overall successful use of these devices. This invention will allow for this.

Correct feature selection for desired output from a copier is often based on accurate knowledge of the original document. The blind or visually impaired are at a disadvantage in that they need to rely on sighted people to determine the characteristics of an original document. They have no way to independently assess their original document.

Embodiments include a method for assisting a visually impaired person with a document job. The method includes scanning a document that includes at least one sheet, detecting at least one characteristic of the scanned document, and providing a signal identifying the at least one characteristic.

Various exemplary embodiments will be described in detail, with reference to the following figures, wherein.

The embodiments disclosed herein describe a method for assisting a visually impaired user to properly scan documents for printing, electronic mailing, or faxing, by providing audio feedback to the user on the characteristics of the scanned document.

Figure 1:
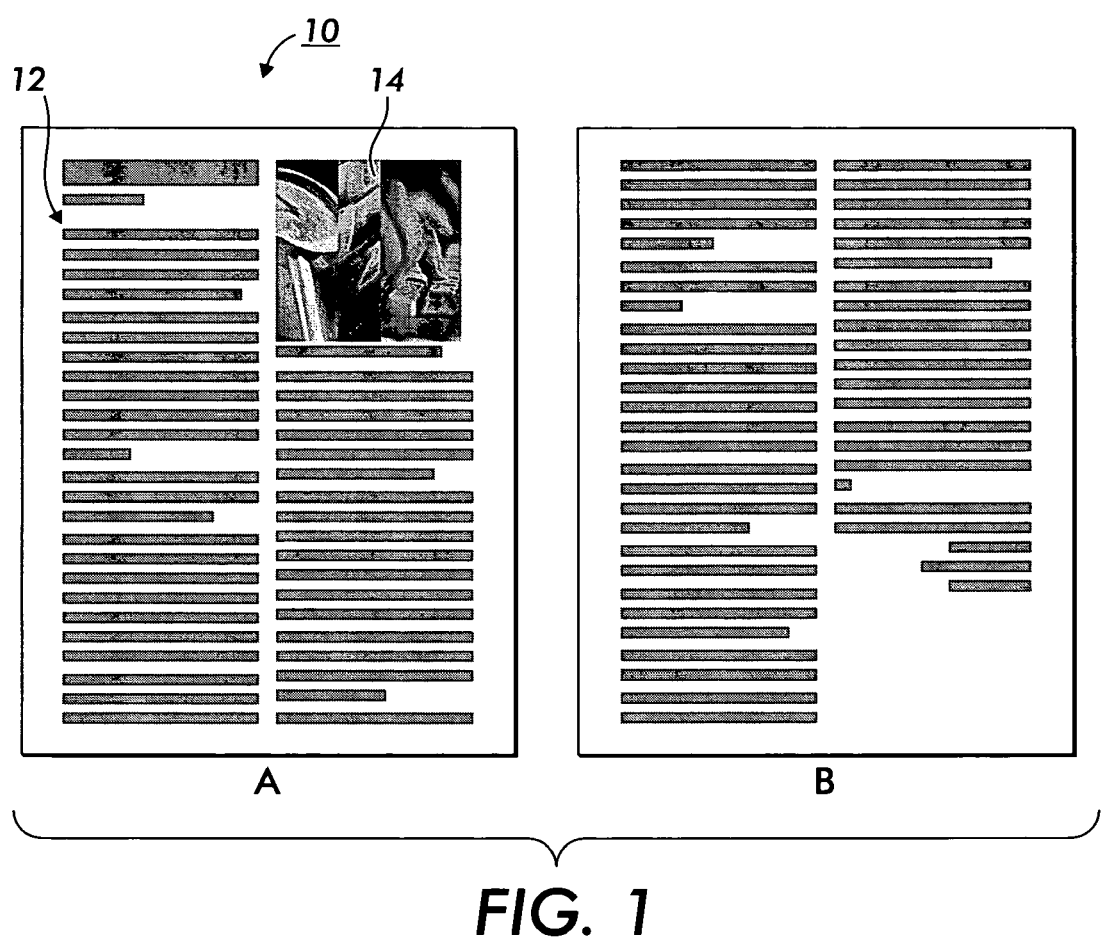
FIG. 1 illustrates a sample document to be scanned/copied.

FIG. 1 shows a sample document 10 to be scanned/copied. The document may contain text 12 and/or pictures 14 as illustrated.

Figure 2:
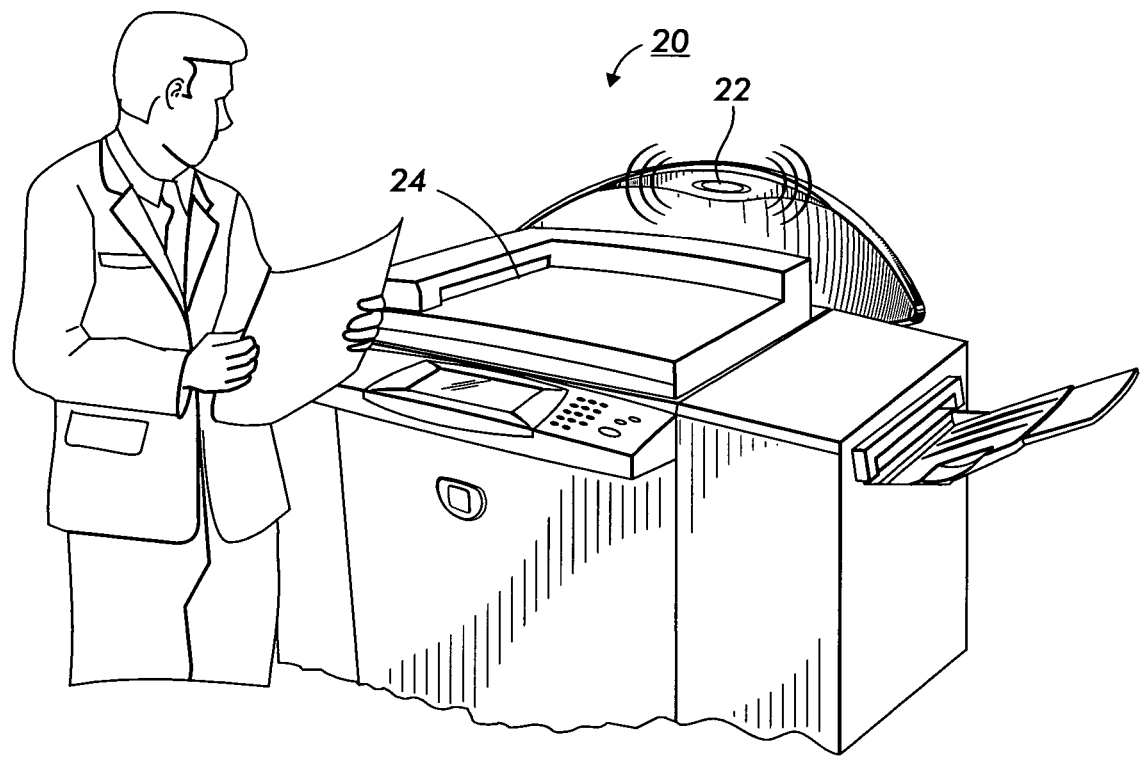
FIG. 2 illustrates an exemplary embodiment of a multifunction device capable of providing audio feedback to a user.

FIG. 2 shows a multifunction device 20 capable of completing many document jobs. The device can scan a document for many purposes including, for example, copying/printing, electronic messaging, or faxing. To scan the document, a user would place the original document in the document feeder 24 or on the platen glass of the device. If the document is placed into the document feeder 20, one or both sides of the document may be scanned without user involvement. Opening the lid and placing the document right on the platen would require the user to invert each sheet to be copied to check both sides for images. As the document is scanned current technology could be used to detect a number of document characteristics. The multifunction device 20 will also be referred to as the scanning device 20, since faxing, copying, and emailing a physical document at a device all involve scanning. In embodiments, the scanning device could have tactilely readable labels or moldings on the control panel so that the visually impaired user will be able to use the device.

For example, the scanner could detect the simple presence or absence of an image on one or both sides of a sheet. If a scanned sheet came up mostly (for example, 98%) blank, then the device would inform the user that that sheet was blank. If the sheet were part of a document, the device could inform the user during the scanning process or the device could wait until the document was fully scanned before doing so. If the device were to scan both sides of a sheet, the device could detect whether the sheets are one-sided are two-sided by the same process. If all the sheets had one side that was substantially image free, the device could inform the user that the sheets are one-sided and also inform the user which sides had images.

The device could also detect characteristics of the image. The device may be used to determine the location of text versus pictures on a page or which sheets have images and which sheets have text. For example, common Optical Character Recognition (OCR) techniques may be employed to scan for text and determine its location if text is present. Further, the device 20 may be programmed to interpret particular arrangements pixels as pictures rather than text.

The device could also be used to detect whether an image on a sheet is color or not. Color is another characteristic of a print job that the user may wish to know. If the user is printing a document, a printing device may present the user with the option of printing the document in color or in black and white. When the image is scanned the device would detect the intensities of each color reflected. If the device detects a black and white image it can inform the user of that fact in case the user wants to select black and white printing, which can be faster or cheaper than color printing in some devices. The user could then make an informed decision about whether to proceed to print the document in color or in black and white.

Many scanning devices also allow the user to increase the lightness or darkness of an image if the image is too light or too dark. The scanner can detect the relative intensity of light reflected from the image during scanning. For example, the scanner may detect that the contrast in intensity between text on the page and the color of the paper is below some preset threshold level. The device would then warn the user that the contrast may not be sufficiently sharp and offer the user the opportunity to darken the image, for example, before printing, faxing, or emailing the sheet in question.

The scanning device 20 can also detect the proper orientation of text on page. OCR devices could easily detect or be modified to detect whether text on a sheet was upside right, upside down, or sideways. This would enable the device to inform the user of, for example, whether the text on the original was landscape or portrait, and whether the document is rotated upside down, right side up, or sideways in relation to themselves. It could also inform the user of the proper way to orient documents if the user were feeding them incorrectly. The user would be informed whether the originals were placed in backwards or upside down. This would be especially important if the user was planning a special finishing job such as stapling.

More specifically, the device could tell the user the proper way to insert the documents if certain finishing options are to be used. For example, the user may want a staple in the top left corner of the document. The device could scan the document and determine that it is upside down and tell the user that the document needs to be rotated 180° for the staple to be in the correct position. For example, the scanner and/or the feeder mechanism could also determine the paper size and paper type (such as, for example, three hole punch) and inform the user how to load the sheets to be copied properly. The device could also present finishing options to the user.

Another method of determining the correct orientation of a sheet would be to use OCR scanning at the margins for page numbers. The device could scan the margins and determine how the numbers were oriented. It could then compare this with a scan of the image to reach a conclusion regarding the orientation of the document.

There are multiple ways in which the user may be informed of the characteristics of a scanned document. In embodiments, the above characteristics could be presented to the user through audible speech. Several well known technologies exist that translate computer text into speech. For example, a screen reader or a text-to-speech application at a nearby PC or within the copier or multifunction device itself could be used. The multifunction device could easily include a speaker 22 built into the device. In embodiments where the audio response is built into the multifunction machine itself, the audible feedback may be turned on or off. An ON/OFF switch could be installed so that non visually impaired users would be able to work quietly when they were using the device.

Figure 3:
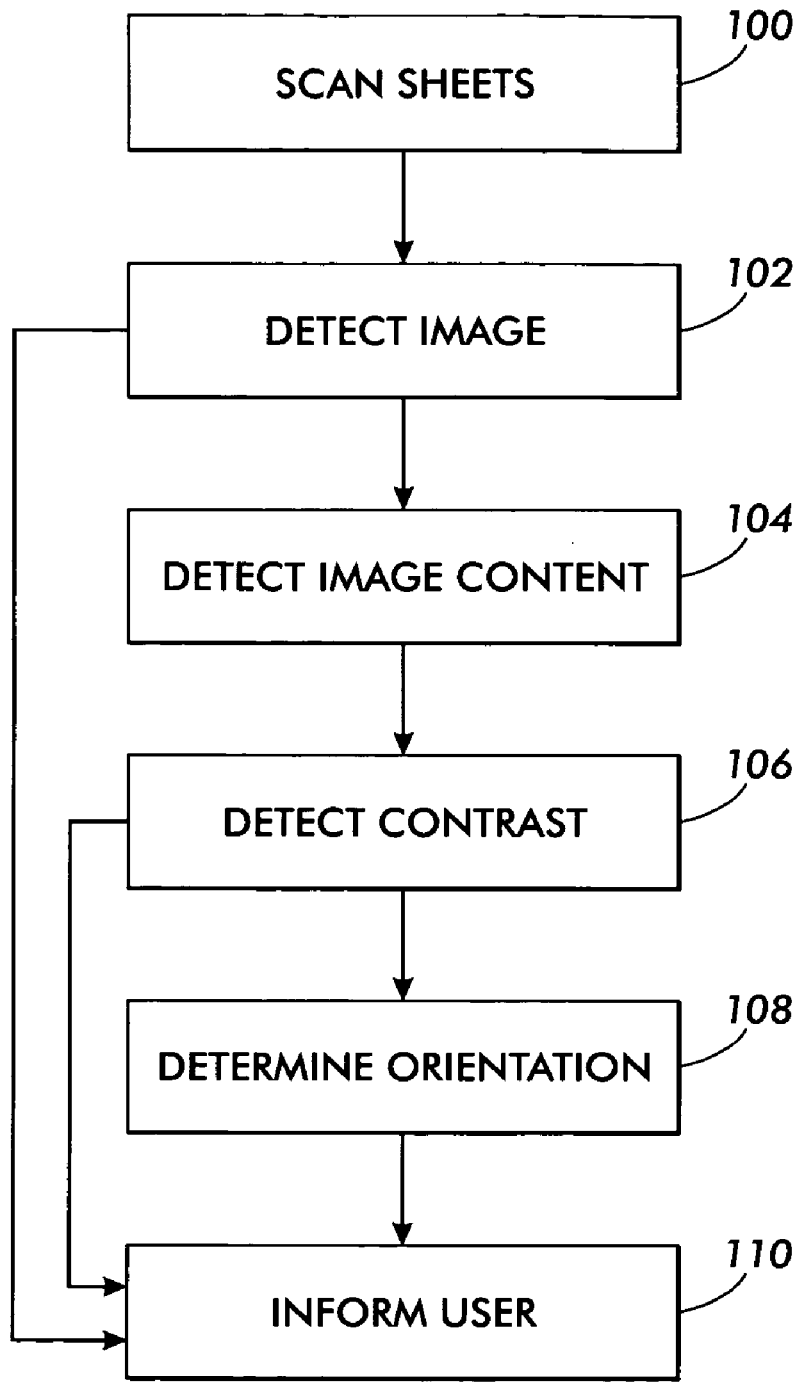
FIG. 3 is a flowchart corresponding to the method of assisting the user.

FIG. 3 corresponds to the methods disclosed herein. The user approaches a multifunction device with a sheet or sheets to be scanned. The multifunction device would scan the sheet(s) 100 and detect certain characteristics of the sheet or sheets. The device would detect whether an image was present on one or both sides of the sheet(s) 102. In embodiments, if needed, the device could inform the user 110 that the sheets may need to be flipped over on the platen or in the feeder. The device would then determine the content of the image 104. This includes determining whether the image contained text or pictures, by for example, using OCR software. This also includes determining whether color is present in the image. The device would also detect the contrast 106 between the foreground and the background. If this value were smaller than a preset value, the device could inform the user so that the user may, for example, increase the contrast by darkening the foreground or lightening the background. The device could also determine the correct orientation of the sheets 108 in the feeder or on the platen and inform the user 110 so that the user may rotate them as needed. The order presented in FIG. 3 should not be construed as a limit on the actual order in which the various characteristics are detected. They are simply a list of various criteria that can be checked during the scanning process.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention. All patent applications, patents and other publications cited herein are incorporated by reference in their entirety.

The invention claimed is:

1. A method for assisting a visually impaired person with a document job, comprising:
    scanning a document that includes at least one sheet;
    detecting at least one characteristic of the scanned document;
    providing a signal to the visually impaired person identifying the at least one characteristic;
    receiving instructions from the visually impaired person in response to the signal provided; and
    completing the document job in accordance with the instructions received.

2. The method of claim 1, wherein the signal is an audible signal.

3. The method of claim 2, wherein the audible signal is computer generated speech.

4. The method of claim 1, wherein detecting includes detecting whether at least one side of the at least one sheet is blank.

5. The method of claim 1, wherein detecting includes detecting whether the at least one sheet includes text.

6. The method of claim 1, wherein detecting includes detecting whether the at least one sheet includes color.

7. The method of claim 1, wherein detecting includes detecting the contrast present in an image.

8. The method of claim 1, wherein detecting includes detecting the orientation of the document.

9. The method of claim 1, wherein completing the document job includes printing the document.

10. The method of claim 1, wherein completing the document job includes faxing the document.

11. The method of claim 1, wherein completing the document job includes emailing the document.

12. A method for assisting a visually impaired person in using a multifunction device, comprising: providing a document including at least one sheet to be scanned by the multifunction device; receiving information regarding at least one characteristic of the at least one sheet from the multifunction device; wherein the visually impaired person instructs the multifunction device to complete a document job based upon the information received, wherein a single entity performs the steps of providing and receiving.

13. The method of claim 12, wherein the information is received as an audible signal.

14. The method of claim 13, wherein the audible signal is computer generated speech.

15. The method of claim 12, wherein the information regarding at least one characteristic includes whether at least one side of the at least one sheet is blank.

16. The method of claim 12, wherein the information regarding the at least one characteristic includes whether the at least one sheet includes text.

17. The method of claim 12, wherein the information regarding at least one characteristic includes whether the at least one sheet includes color.

18. The method of claim 12, wherein the information regarding the at least one characteristic includes the contrast present in the image.

19. The method of claim 12, wherein the information regarding at least one characteristic includes the orientation of the document.

20. The method of claim 1, wherein completing the document job includes canceling the document job.

\* \* \* \* \*